US011545737B2

(12) United States Patent
Cordone

(10) Patent No.: US 11,545,737 B2
(45) Date of Patent: Jan. 3, 2023

(54) MULTIPLE ANTENNA SYSTEM AND METHOD FOR MOBILE PLATFORMS

(71) Applicant: GOGO BUSINESS AVIATION LLC, Broomfield, CO (US)

(72) Inventor: Sean Scott Cordone, Wheaton, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 272 days.

(21) Appl. No.: 16/868,321

(22) Filed: May 6, 2020

(65) Prior Publication Data

US 2020/0266527 A1 Aug. 20, 2020

Related U.S. Application Data

(63) Continuation of application No. 15/382,227, filed on Dec. 16, 2016, now Pat. No. 10,680,315, which is a (Continued)

(51) Int. Cl.
*H01Q 1/27* (2006.01)
*H01Q 1/28* (2006.01)
(Continued)

(52) U.S. Cl.
CPC .............. *H01Q 1/27* (2013.01); *H01Q 1/28* (2013.01); *H01Q 1/285* (2013.01); *H01Q 1/42* (2013.01);
(Continued)

(58) Field of Classification Search
CPC .................................................. H04B 7/18567
See application file for complete search history.

(56) References Cited

U.S. PATENT DOCUMENTS 4,148,039 A    4/1979  Lunden
4,780,885 A *  10/1988 Paul ....................... H04B 7/005
                                                  455/67.14
(Continued)

FOREIGN PATENT DOCUMENTS

CN      1516358 A    7/2004
CN      1605165 A    4/2005
(Continued)

OTHER PUBLICATIONS

Chinese Patent Application No. 201910256891.X, Office Action, dated Nov. 12, 2021.
(Continued)

*Primary Examiner* — Bernarr E Gregory
(74) *Attorney, Agent, or Firm* — Marshall, Gerstein & Borun LLP; Randall G. Rueth

(57) ABSTRACT

A method and system facilitate communication between a constellation of satellites and a mobile platform-mounted mobile communicator. The method and system may include the use of a first antenna suited for operation using a first frequency band in a first geographic region and a second antenna suited for operation using either the first or a second frequency band in a second geographic region. The method and system may use a controller to determine which antenna to activate based on one or more of a geographic indicator or a signal indicator. The system used by the method to facilitate the communication may have one or more enclosures over the antennas and controller for mounting to a mobile platform.

17 Claims, 3 Drawing Sheets

Related U.S. Application Data continuation of application No. 14/177,863, filed on Feb. 11, 2014, now Pat. No. 9,553,657.

(60) Provisional application No. 61/901,848, filed on Nov. 8, 2013, provisional application No. 61/763,350, filed on Feb. 11, 2013.

(51) Int. Cl.

| | | |
|---|---|---|
| *H01Q 1/42* | (2006.01) | |
| *H01Q 3/24* | (2006.01) | |
| *H01Q 3/26* | (2006.01) | |
| *H01Q 21/22* | (2006.01) | |
| *H01Q 21/28* | (2006.01) | |
| *H01Q 25/02* | (2006.01) | |
| *H04B 7/185* | (2006.01) | |
| *H04W 24/08* | (2009.01) | |
| *H01Q 1/00* | (2006.01) | |

(52) U.S. Cl.
CPC .............. *H01Q 3/24* (2013.01); *H01Q 3/26* (2013.01); *H01Q 21/22* (2013.01); *H01Q 21/28* (2013.01); *H01Q 25/02* (2013.01); *H04B 7/18508* (2013.01); *H04B 7/18515* (2013.01); *H04B 7/18519* (2013.01); *H04B 7/18573* (2013.01); *H04W 24/08* (2013.01)

(56) References Cited

U.S. PATENT DOCUMENTS

| | | | |
|---|---|---|---|
| 5,201,072 A | 4/1993 | Kobayashi | |
| 5,551,624 A | 9/1996 | Horstein et al. | |
| 5,610,617 A | 3/1997 | Gans et al. | |
| 5,640,452 A | 6/1997 | Murphy | |
| 5,657,026 A | 8/1997 | Culpepper et al. | |
| 5,678,171 A | 10/1997 | Toyama et al. | |
| 5,710,995 A | 1/1998 | Akaiwa et al. | |
| 5,852,721 A | 12/1998 | Dillon et al. | |
| 5,990,928 A | 11/1999 | Sklar et al. | |
| 6,009,307 A | 12/1999 | Granata et al. | |
| 6,111,542 A | 8/2000 | Day et al. | |
| 6,201,797 B1 | 3/2001 | Leuca et al. | |
| 6,208,307 B1 | 3/2001 | Frisco et al. | |
| 6,272,317 B1 | 8/2001 | Houston et al. | |
| 6,393,001 B1 | 5/2002 | Miyata | |
| 6,400,696 B1 | 6/2002 | Hreha | |
| 6,460,808 B2 | 10/2002 | Taormina et al. | |
| 6,477,152 B1 | 11/2002 | Hiett | |
| 6,477,370 B1* | 11/2002 | Sigler ................. H04B 7/18567 |
| | | | 455/512 |
| 6,529,706 B1 | 3/2003 | Mitchell | |
| 6,570,528 B1 | 5/2003 | Rao et al. | |
| 6,600,933 B1* | 7/2003 | Hiramatsu ........... H04B 7/0623 |
| | | | 455/522 |
| 6,643,510 B2 | 11/2003 | Taylor | |
| 6,708,028 B1 | 3/2004 | Byrne | |
| 6,735,184 B1 | 5/2004 | Davidson et al. | |
| 6,741,841 B1 | 5/2004 | Mitchell | |
| 6,757,712 B1 | 6/2004 | Bastian et al. | |
| 6,775,251 B1 | 8/2004 | Wiedeman et al. | |
| 6,885,863 B2 | 4/2005 | Parkman et al. | |
| 6,944,450 B2 | 9/2005 | Cox | |
| 7,027,418 B2* | 4/2006 | Gan .................... H04W 72/085 |
| 7,054,593 B2 | 5/2006 | de La Chapelle et al. | |
| 7,167,704 B2 | 1/2007 | Chang et al. | |
| 7,171,175 B2 | 1/2007 | Lahti et al. | |
| 7,248,843 B2* | 7/2007 | Carvalho ............. H04B 7/0811 |
| | | | 455/67.11 |
| 7,426,232 B2 | 9/2008 | Matsuoka et al. | |
| 7,502,592 B2 | 3/2009 | Yamamoto et al. | |
| 7,505,736 B2 | 3/2009 | Min | |
| 7,535,971 B2 | 5/2009 | Yen et al. | |
| 7,561,881 B2 | 7/2009 | Feher | |
| 7,675,849 B2 | 3/2010 | Watson et al. | |
| 7,715,783 B2 | 5/2010 | Girard et al. | |
| 7,750,863 B2 | 7/2010 | Wesel | |
| 7,893,885 B2 | 2/2011 | Jung et al. | |
| 8,032,135 B1 | 10/2011 | Redford et al. | |
| 8,094,605 B2* | 1/2012 | Lynch ................. H04W 72/042 |
| | | | 455/12.1 |
| 8,176,520 B1 | 5/2012 | Mitchell | |
| 8,213,867 B2* | 7/2012 | Zhang .................... H04W 24/08 |
| | | | 455/67.11 |
| 8,380,186 B2 | 2/2013 | Karabinis | |
| 8,441,913 B2 | 5/2013 | Li et al. | |
| 8,520,625 B2 | 8/2013 | Ghassemzadeh et al. | |
| 8,606,433 B2 | 12/2013 | Taylor | |
| 8,686,900 B2 | 4/2014 | Whitehead et al. | |
| 8,730,103 B2 | 5/2014 | Chaudhary et al. | |
| 9,253,759 B2* | 2/2016 | Chang ................. H04W 72/085 |
| 9,553,657 B2 | 1/2017 | Cordone | |
| 9,668,147 B2 | 5/2017 | Ling | |
| 9,894,538 B2 | 2/2018 | Ling | |
| 10,680,315 B2* | 6/2020 | Cordone .................. H01Q 3/24 |
| 2003/0112180 A1 | 6/2003 | Wight | |
| 2003/0152046 A1* | 8/2003 | Kawai .................... H04W 72/02 |
| | | | 370/348 |
| 2005/0064825 A1 | 3/2005 | Forrester | |
| 2006/0017638 A1 | 1/2006 | Guidon et al. | |
| 2006/0212909 A1 | 9/2006 | Girard et al. | |
| 2007/0013593 A1 | 1/2007 | Zafar et al. | |
| 2009/0081947 A1 | 3/2009 | Margis | |
| 2009/0258622 A1 | 10/2009 | Ruijter | |
| 2009/0322551 A1* | 12/2009 | Kanagala ................. G01S 1/68 |
| | | | 340/539.23 |
| 2010/0330940 A1 | 12/2010 | Sheynblat et al. | |
| 2012/0200458 A1 | 8/2012 | Jalali et al. | |
| 2012/0231788 A1 | 9/2012 | Kaminski et al. | |
| 2012/0236785 A1 | 9/2012 | Lynch et al. | |
| 2012/0236805 A1 | 9/2012 | Kuo et al. | |
| 2015/0229382 A1 | 8/2015 | Lee et al. | |
| 2018/0160317 A1 | 6/2018 | Ling | |

FOREIGN PATENT DOCUMENTS

| | | | |
|---|---|---|---|
| CN | 1619979 A | 5/2005 | |
| CN | 102598406 A | 7/2012 | |
| CN | 102077490 B | 2/2017 | |
| EP | 1432067 A2 | 6/2004 | |
| JP | 2000-115049 A | 4/2000 | |
| JP | 2000-196512 A | 7/2000 | |
| JP | 2001-111467 A | 4/2001 | |
| JP | 2005-502243 A | 1/2005 | |
| JP | 2007-214901 A | 8/2007 | |
| WO | WO-97/09792 A1 | 3/1997 | |
| WO | WO-2003-021977 A2 | 3/2003 | |
| WO | WO-2010/025997 A1 | 3/2010 | |

OTHER PUBLICATIONS

Japanese Patent Application No. 2018-55094, Notice of Reasons for Refusal, dated May 29, 2020.
Japanese Patent Application No. 2018-055094, Report of Re-Examination, dated Jan. 15, 2020.
Chinese Office Action with English Translation for Application No. 201480012274.0, dated Apr. 25, 2017.
Communication pursuant to Article 94(3) EPC for European Application No. 14706243.4, dated Oct. 10, 2018.
Decision for Refusal in Japanese Patent Application No. 2018-055094, dated Jul. 2, 2019.
International Search Report and Written Opinion for Application No. PCT/US2014/015867 dated May 19, 2014.
Jain, P., Architectural trends in military satellite communications systems, Proceedings of the IEEE, 78: 1176-1189 (1990).
Japanese Office Action with English Translation for Application No. 2015-557206, dated Jul. 25, 2017.
Japanese Office Action with translation for Application No. 2018-055094, dated Mar. 12, 2019.

(56) References Cited

OTHER PUBLICATIONS

M. I. Skolnik, "Introduction to Radar Systems," second edition; p. 8, Table 1.1; McGraw-Hill Book Company, New York, NY, USA; copyright in the year 1980. ISBN 0-07-057909-1. (Year: 1980).

Merrill I. Skolnik, "Introduction to Radar Systems"; second edition; McGraw-Hill Book Company; New York, NY, USA; section 7.9, pp. 264-270; ISBN 0-07-057909-1; copyright in the year 1980. (Year: 1980).

Notice of Reason(s) for Refusal in Japanese Patent Application No. 2015-557206, dated Oct. 18, 2016.

S. Chia, "The Universal Mobile Telecommunication System"; "IEEE Communications Magazine"; vol. 30, issue 12; Dec. 1992; pp. 54-62; publication 0163-6804/92/$03.00. (Year: 1992).

Second Official Action dated Jan. 10, 2018 in Chinese Patent Application No. 201480012274.0 and translation thereof.

Third Office Action dated Jul. 24, 2018 in Chinese Patent Application No. 201480012274.0, and translation thereof.

Chinese Patent Application No. 201910256891.X, Second Office Action, dated May 24, 2021.

Zhang et al., "Introduction to New System Radar Countermeasures", Beijing Institute of Technology Press, pp. 233-240 (Jan. 2010).

Chinese Patent Application No. 201910256891.X, Decision of Rejection, dated Mar. 30, 2022.

\* cited by examiner

MULTIPLE ANTENNA SYSTEM AND METHOD FOR MOBILE PLATFORMS

CROSS-REFERENCE TO RELATED PATENT APPLICATION

This is a continuation of U.S. patent application Ser. No. 15/382,227, filed Dec. 16, 2016, now U.S. Pat. No. 10,680,315, which is a continuation of U.S. patent application Ser. No. 14/177,863, filed Feb. 11, 2014, now U.S. Pat. No. 9,553,657, which claims the benefit of U.S. Provisional Application No. 61/763,350, filed Feb. 11, 2013 and U.S. Provisional Application No. 61/901,848, filed Nov. 8, 2013. The entire contents of each of the foregoing are expressly incorporated herein by reference for all purposes.

FIELD OF INVENTION

The present disclosure generally relates to a system and method for providing for multi-regional communication with a satellite network using different antennas suited for use in different regions and, more particularly to a communicator mounted on a mobile platform with a first antenna suited for use in a first region and a second antenna suited for use in a second region that are controlled to optimize access to the satellite network as the mobile platform moves from the first region to the second region.

BACKGROUND

Since the beginning of powered flight, it has been of paramount importance for people onboard a plane to be able to communicate with people on the ground. As technology advanced, this communication began to include digital data as well as analog voice signals. Further advances lead to the technology to permit aircraft to communicate with satellites to relay information to and from ground stations so aircraft could continue to be in communication over land and ocean, anywhere around the world. More recently, passengers on the aircraft have been given access to these satellite systems, especially to use the satellite systems to access the Internet. The aircraft may access the satellite system with an antenna or antenna array suited for communication with the satellite system. However, different locations around the globe may call for different types of antennas to optimize communication, so a satellite transceiver with only a single type of antenna may not provide adequate service if the mobile platform to which it is mounted moves across the globe. In particular, an aircraft flying a transcontinental route may experience a reduced ability to communicate with the satellite system as it moves from a polar latitude toward the Equator.

SUMMARY OF THE DISCLOSURE

Accordingly, it may be advantageous to create a system which includes multiple types of antennas where different antennas are suitable for usage in different geographic areas as well as different atmospheric conditions. The system may include a controller or processor to determine which of the antennas to use to communicate with the satellite network.

In an embodiment, a mobile platform-mounted mobile communicator for communicating with a constellation of satellites including a first antenna optimized for operation using a frequency band in a first geographic region; a second antenna suited for operation using either the first frequency band or a second frequency band in a second geographic region; a controller or processor configured to determine which antenna to activate based on one or more of a geographic indicator or a signal indicator; and one or more enclosures or radomes for the mobile platform-mounted mobile communicator.

In another embodiment, a method of communicating with a constellation of satellites using a mobile platform including: communicating with the constellation of satellites on a first frequency band using a first antenna, wherein the first antenna is optimized for operation in a first geographic location; determining, with a processor, to terminate communication via the first antenna and begin communication via a second antenna based on one of a geographic indicator or a signal indicator; wherein the second antenna is optimized for operation in a second geographic location; and communicating with the constellation of satellites on either the first frequency band or a second frequency band using the second antenna.

In another embodiment, a method of communicating with a mobile communicator mounted to a mobile platform including: using a first antenna of the mobile communicator to establish communication with a first satellite; communicating data packets with the first satellite via the first antenna; receiving one or more of a geographic indicator or a signal indicator; based on the one or more of a geographic indicator or a signal indicator, determining, by a processor, to terminate communication via the first antenna and begin communication via a second antenna of the mobile communicator; terminating communication via the first antenna; configuring the second antenna to establish communication with one of the first satellite or a second satellite; and communicating data packets with one of the first satellite or the second satellite via the second antenna.

In another embodiment, a satellite communication system including: a first satellite for communication on a frequency band; a mobile platform, wherein the mobile platform is capable of moving from a first region to a second region; and a mobile communicator mounted to the mobile platform including: a first antenna array for communication on either a first frequency band or a second frequency band, a second antenna array for communication on either the first frequency band or the second frequency band, a communicator controller configured to determine whether to use the first antenna array or the second antenna array, selectively enable and disable the first antenna array, and selectively enable and disable the second antenna array, and an enclosure for the mobile communicator.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
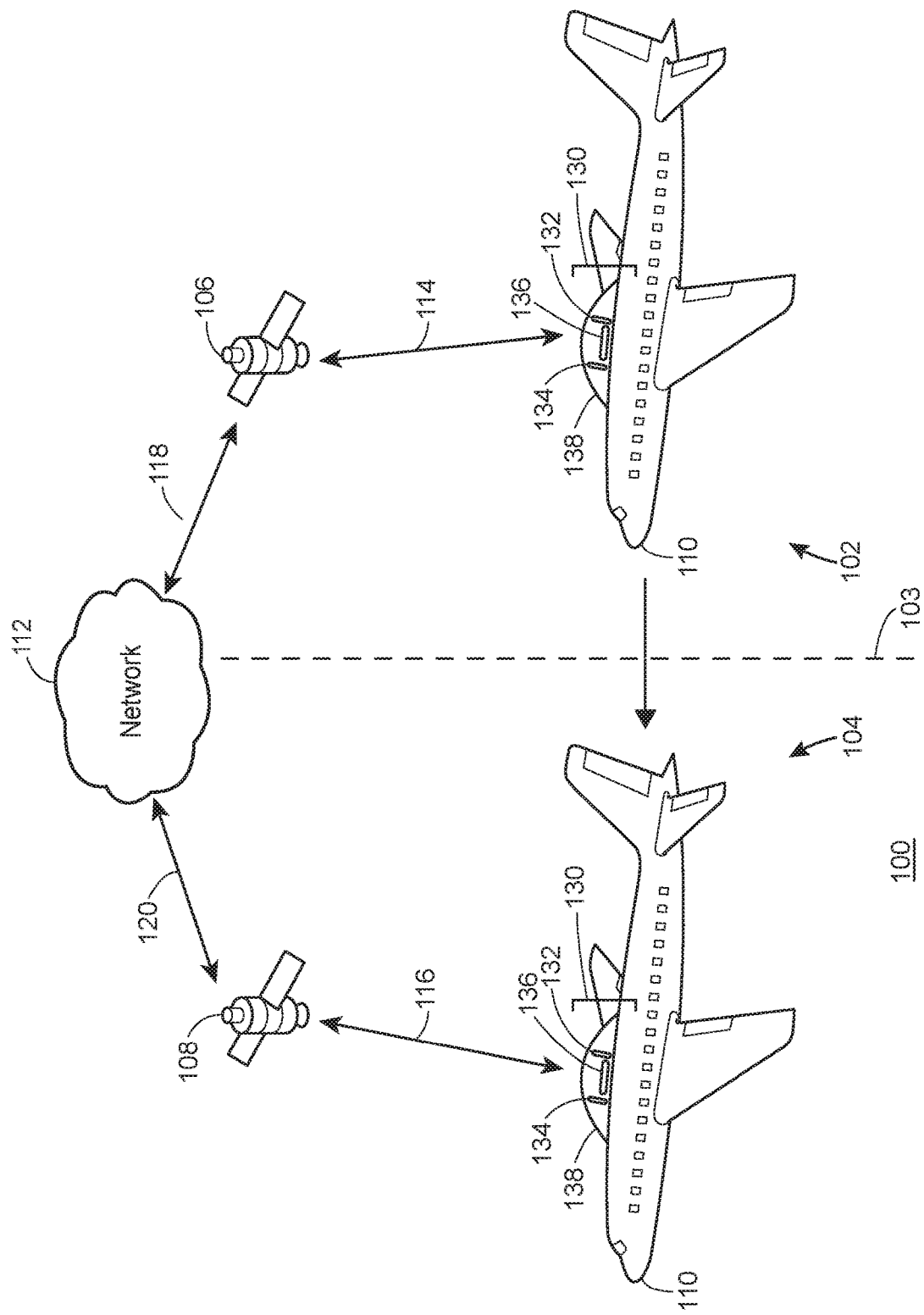
FIG. 1 illustrates a block diagram of a constellation of satellites and a mobile platform with a mobile platform-mounted mobile communicator on with an exemplary multi-region satellite communication method may operate in accordance with the described embodiments.

FIG. 1 illustrates an embodiment of a system 100 for providing communications between a constellation of satellites and a mobile platform using a multi-antenna array. The system 100 may be used in either or both of a first region 102 and a second region 104. The first region 102 and second region 104 may be any of a number of regions with different environments for transmitting and receiving a signal to and from one or more satellites. As discussed below, one of the antennas of the system 100 may be more suitable than another antenna of the system 100 because of the different environments for transmitting and receiving a signal to and from the one or more satellites. The first region 102 and second region 104 may be geographically defined. For example, the first region 102 may be a region closer to either the North Pole or South Pole than the Equator and the second region 104 may be a region closer to the Equator than either Pole. In another example, the first region 102 may be defined as a region where the line of sight angle to the nearest satellite is relatively higher than the line of sight angle to the nearest satellite in the second region 104. The first region 102 and second region 104 may also be defined by atmospheric conditions. For example, the first region 102 may be defined as a region where the moisture content in the ambient air is relatively higher than the moisture content in the ambient air in the second region 104. In another example, the first region 102 may be defined as a region where there is more interference on the frequency bands used by the system 100 than in the second region 102. The first region 102 and second region 104 may be separated by a boundary 103. The boundary 103 may be a fixed geographic boundary (e.g., the Tropic of Cancer, the Tropic of Capricorn, etc.) or it may be a shifting boundary between the first region 102 and second region 104.

The system 100 may include a constellation of satellites including a first satellite 106 and a second satellite 108. If the regions 102 and 104 are geographically defined, the satellites 106 and 108 may be in geostationary orbit over the respective first region 102 and second region 104. However, it will be understood that the satellites 106 and 108 may orbit the Earth at any number of altitudes and speeds and may not be in geostationary orbit. The satellites 106 and 108 may be communications satellites relaying information to and from a mobile platform 110 (over connections 114 and 116 as discussed below) and a network 112 (over connections 118 and 120, respectively). The network 112 may be a proprietary network, a public internet, a virtual private network or some other type of network, such as dedicated access lines, plain ordinary telephone lines, satellite links, combinations of these, etc. Where the network 112 comprises the Internet, data communications may take place over the network 130 via an Internet communication protocol. The mobile platform 110 may be any vehicle or mobile device capable of travelling from the first region 102 to the second region 104. While the mobile platform 110 pictured in FIG. 1 is an airplane, it will be understood that the mobile platform 110 can be a ship, boat, yacht, submarine, automobile, truck, motorcycle, helicopter, drone, or other vehicle capable of moving along the air, land, or sea. While only a single mobile platform 110 is shown in FIG. 1, it will be understood that the constellation of satellites may be used to communicate with tens, hundreds, thousands, etc. of mobile platforms 110. Similarly, while only two satellites 106 and 108 are picture in FIG. 1, it will be appreciated that the constellation of satellites may include tens, hundreds, or any number of satellites coving all or part of the globe. Further, the network 112 may be made of tens, hundreds, or any number of sub-networks which may or may not communicate with each other in known ways.

The system 100 may include a mobile platform-mounted mobile communicator 130 comprising a first antenna array 132, a second antenna array 134, a mobile platform-mounted mobile communicator controller 136, and a radome enclosure 138. The first antenna array 132 may be optimized for communication with satellites under the conditions found in the first region 102. For example, if the first region 102 is closer to either the North Pole or South Pole than the Equator, the first antenna array 132 may be well suited to operation near the Poles. For example, the first antenna array 132 may be an AeroSat HR6400 antenna system, a KuStream 2000 antenna system, or an Auro LE antenna, the specifications for which are hereby incorporated by reference in their entirety. The first antenna array 132 may communicate with the constellation of satellites over the link 114, which may be a link to the satellite 106 as depicted in FIG. 1. While the phrase "first antenna array" is used herein, it will be understood that the first antenna array 132 may be a single antenna or an array including a plurality of antennas. The second antenna array 134 may be optimized for communication with satellites under the conditions found in the second region 104. For example, if the second region 104 is closer to the Equator, the second antenna array 134 may be well suited to operation near the Equator. For example, the second antenna array 134 may be a ThinKom Solutions Variable Inclination Continuous Transverse Stub (VICTS) array. The second antenna 134 may also be similar to the conformal phased array antenna array described in "Conformal Phased Array With Beam Forming for Airborne Satellite Communication" by Schippers et al. or the antenna system described in U.S. Pat. No. 7,068,235 to Guidon et al., both of which are hereby incorporated by reference. The second antenna array 132 may communicate with the constellation of satellites over the link 116, which may be a link to the satellite 108 or a different satellite using any one of a plurality of frequency bands as depicted in FIG. 1. While the phrase "second antenna array" is used herein, it will be understood that the second antenna array 134 may be a single antenna or an array including a plurality of antennas.

The system 100 may use any of a number of frequency bands to send and receive messages. Messages to and from the satellites 106 and 108 may be modulated onto waves with frequencies in one of several known satellite communication bands. For example, the messages to and from the satellites 106 and 108 may be modulated onto waves in the microwave band of the electromagnetic spectrum. In particular, the carrier wave frequencies may be in the $K_u$ band between 12-18 GHZ and/or the $K_a$ band between 26.5-40 GHz. Of course, other bands in the microwave spectrum may be used. Further, it will be understood that bands outside the microwave spectrum may be used.

Figure 2:
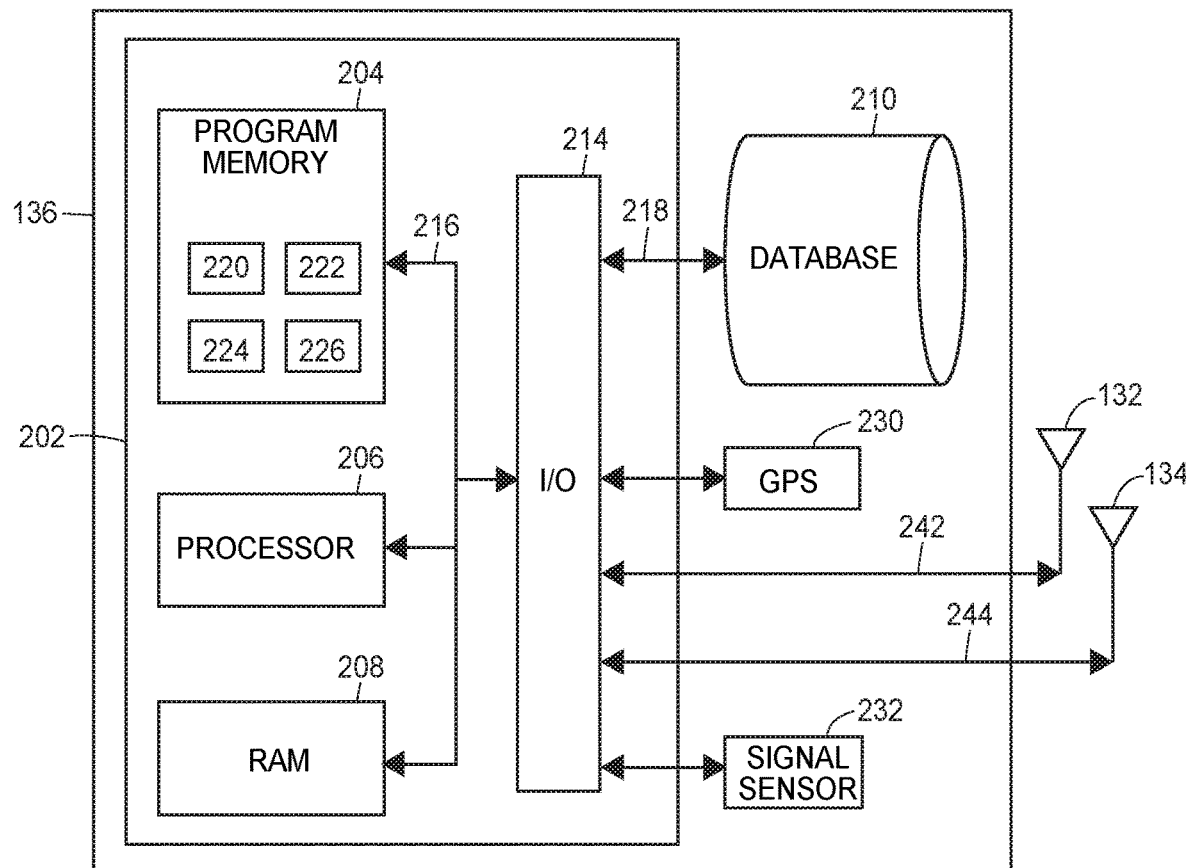
FIG. 2 illustrates a block diagram of a mobile platform-mounted mobile communicator controller.

The mobile platform-mounted mobile communicator controller/processor 136 may be a computer or real-time controller adapted and configured to execute various software applications and functions to select which antenna array to use to communicate with the constellation of satellites and facilitate communication with the constellation of satellites using the selected antenna array. FIG. 2 illustrates a block diagram of an exemplary mobile platform-mounted mobile communicator controller 136. The mobile platform-mounted mobile communicator controller 136 may have a controller 202 that is operatively connected to the database 210 (e.g., one or more hard disk drives, optical storage drives, solid state storage devices, etc.) via a link 218. The database 210 is adapted to store data related to the operation of the mobile platform-mounted mobile communicator 130, and mobile platform-mounted mobile communicator controller 136 may access data stored in the database 210 when executing various functions and tasks associated with the operation of the mobile platform-mounted mobile communicator 130. Such data might include, for example, geographic location data from a GPS unit 230, sensor data from a signal sensor 232, application data for the plurality of applications 224, routine data for the plurality of routines 226, or other kinds of data. It should be noted that, while not shown, additional databases may be linked to the controller 202 in a known manner.

The controller 202 may include a program memory 204, a processor 206 (may be called a microcontroller or a microprocessor), a random-access memory (RAM) 208, and an input/output (I/O) circuit 214, all of which may be interconnected via an address/data bus 216. It should be appreciated that although only one microprocessor 206 is shown, the controller 202 may include multiple microprocessors 206. Similarly, the memory of the controller 202 may include multiple RAMs 208 and multiple program memories 204. Although the I/O circuit 214 is shown as a single block, it should be appreciated that the I/O circuit 214 may include a number of different types of I/O circuits. The program memory 204 and/or the RAM 208 may include a graphical user interface 220, a mobile platform-mounted mobile communicator controller 222, a plurality of software applications 224, and a plurality of software routines 226. The graphical user interface 220 may be a set of instructions that when executed by the processor 206 cause a display (not shown) to display information to a user and/or receive input from the user, administrator, technician, etc. tasked with configuring the mobile platform-mounted mobile communicator controller 136. The mobile platform-mounted mobile communicator controller 222 may be a set of instructions that when executed by the processor 206 cause the mobile platform-mounted mobile communicator controller 136 to carry out the functions associated with the exemplary mobile platform-mounted mobile communicator 130 described herein. The RAM(s) 208 and program memories 204 may be implemented as semiconductor memories, magnetically readable memories, and/or optically readable memories, for example. The signal sensor 232 may be operatively connected to the first antenna array 132 over link 242 and the second antenna array 134 over link 244. As discussed below, the mobile platform-mounted mobile communicator controller 136 may be able to enable or disable the first antenna array 132 and/or second antenna array 134 using the respective links 242 and 244.

The GPS unit 230 may use satellite GPS or any other suitable global positioning protocol (e.g., the GLONASS system operated by the Russian government) or system that locates the position of the mobile platform 110 and/or mobile platform-mounted mobile communicator controller 136. Those of ordinary skill in the art will appreciate that the positional data need not come directly from a satellite as it could be data obtained or derived from an inertial reference unit of the aircraft. While only a single GPS unit 230 is shown in FIG. 2, any number of GPS units 230 may be used to gather geographic data. The GPS unit 230 may be integrated into the mobile platform-mounted mobile communicator controller 136 as shown in FIG. 2, or may be installed separately on the mobile platform 110 and communicating geographic data to the mobile platform-mounted mobile communicator controller 136 (e.g., via the I/O circuit 214). The geographic data gathered by the GPS unit 230 may include information about the longitudinal and latitudinal coordinates and/or altitude of the mobile platform 110 and/or mobile platform-mounted mobile communicator controller 136.

The signal sensor 232 may be used to gather signal data. The signal sensor 232 may be integrated into the mobile platform-mounted mobile communicator controller 136 as shown in FIG. 2, or may be installed separately on the mobile platform 110 and communicating geographic data to the mobile platform-mounted mobile communicator controller 136 (e.g., via the I/O circuit 214). While only a single signal sensor 232 is shown in FIG. 2, any number of signal sensors 232 may be used to gather signal data. Signal data may include information about signal strength and signal quality. The signal sensor 232 may gather information about signal-noise ratio, attenuation, interference, degradation, electromagnetic environment, or any other measurements indicating factors that may affect how effectively the mobile platform-mounted mobile communicator 130 is able to use either or both of the first antenna array 132 or second antenna array 134 to transmit signals to and receive signals from the constellation of satellites.

Figure 3:
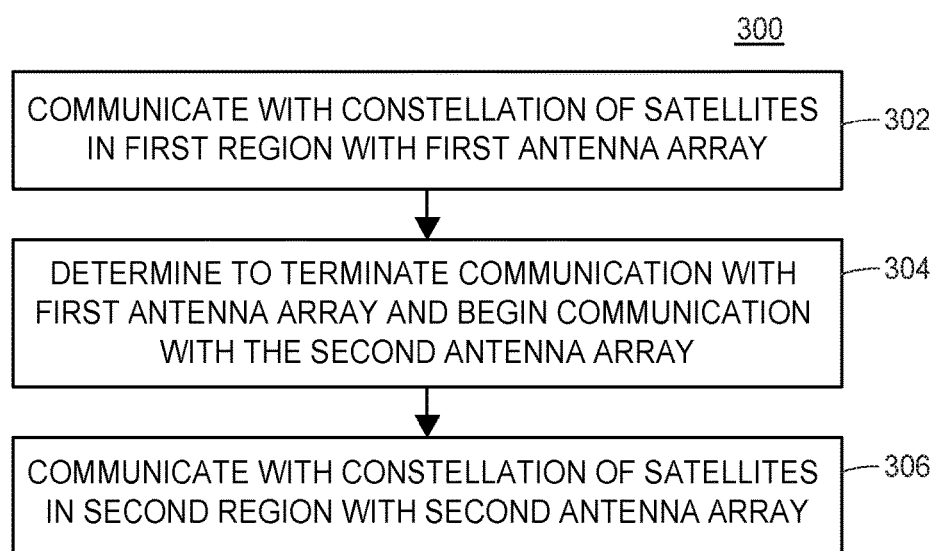
FIG. 3 illustrates an exemplary multi-region satellite communication method operating in accordance with the described embodiments.
Figure 4:
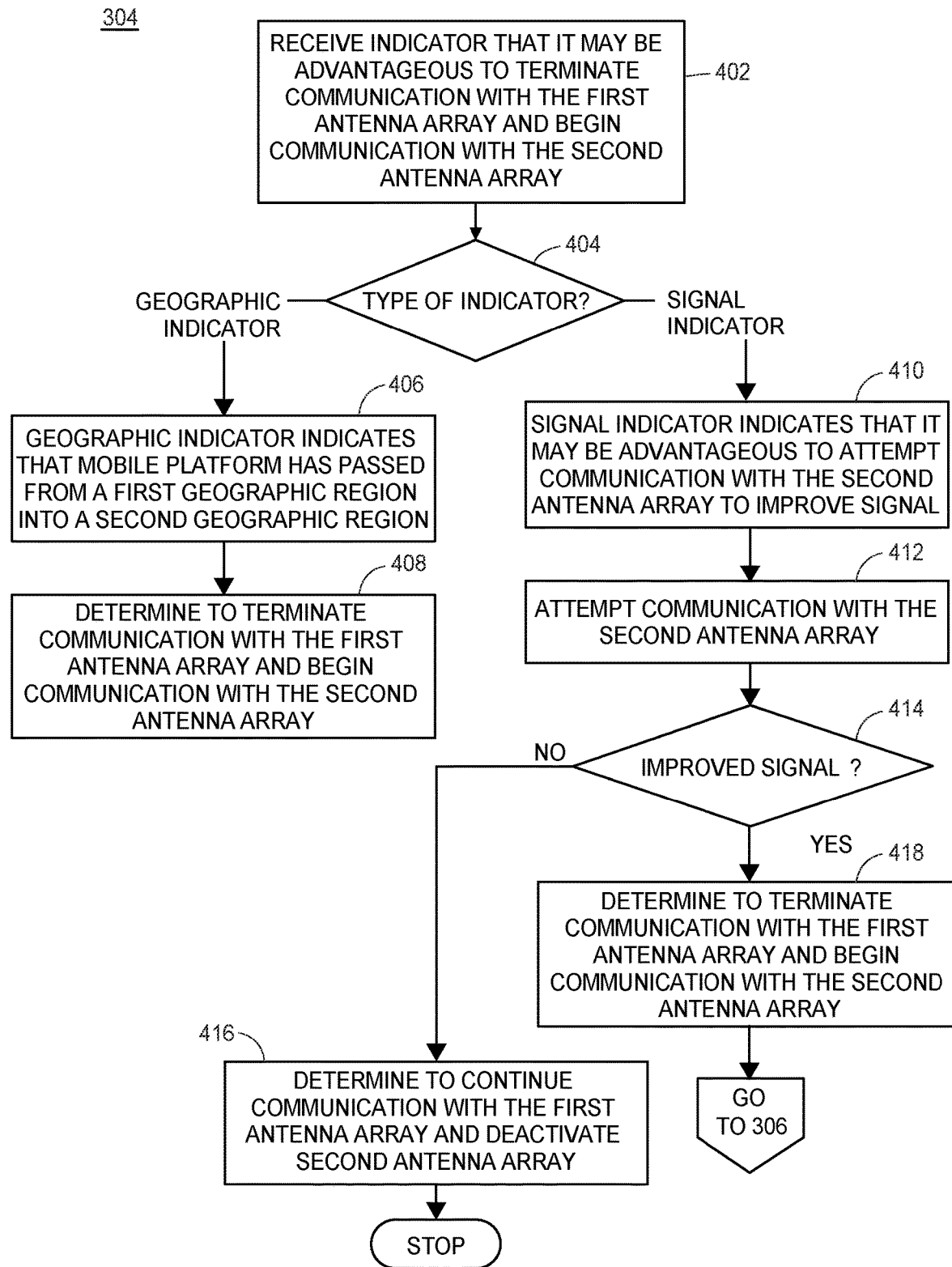
FIG. 4 illustrates an exemplary antenna array selection method operating in accordance with the described embodiments.

FIG. 3 is a flow diagram depicting an exemplary embodiment of a multi-region satellite communication method 300 implemented by the system 100. More particularly, the method 300 may be performed by the mobile platform-mounted mobile communicator 130 in conjunction with the satellites 106 and 108 and network 112. While the mobile platform 110 is in the first region 102, the mobile platform-mounted mobile communicator 130 may facilitate communication between the mobile platform 110 and the first satellite 106 using the first antenna array 132 (block 302). The mobile platform-mounted mobile communicator 130 may periodically verify its presence in the first region 102 by checking the geographic data or signal data. The mobile platform-mounted mobile communicator 130 then determines to terminate communication via the first antenna array 132 and begin communication via the second antenna array 134 (block 304). FIG. 4 shows further detail about the steps undertaken to implement block 304. After determining to terminate communication via the first antenna array 132 and begin communication via the second antenna array 134, the mobile platform-mounted mobile communicator controller 136 may disable the first antenna array 132 using link 242 and enable the second antenna array 134 using link 244 (block 306). After enabling the second antenna array 134, the mobile platform-mounted mobile communicator 130 may facilitate communication between the mobile platform 110 and second satellite 108 using the second antenna array 134. Referring again to FIG. 1, while FIG. 1 shows the use of both a first satellite 106 and a second satellite 108, it will be understood that the method 300 may be used to communicate via the first antenna array 132, determine to terminate communication via the first antenna array 132 and begin communication with the second antenna array 134, and communicate via the second antenna array 134 while only using a single satellite 106 or 108 (i.e., the satellite 106 is used to communicate with the mobile platform 110 in both regions). The method may also include communications with one or more satellites using a single band or frequency range, or with a second frequency band or frequency range.

FIG. 4 is a flow diagram depicting an exemplary embodiment of an antenna array selection method 400 implemented by the system 100 as part of block 304. The mobile platform-mounted mobile communicator controller 136 may receive an indicator that it may be advantageous to terminate communication via the first antenna array 132 and begin communication via the second antenna array 134 (block 402). The indicator may be derived from or based on geographic or signal data. The mobile platform-mounted mobile communicator controller 136 may determine whether the indicator is a geographic indicator or a signal indicator (block 404). A geographic indicator may include latitude and longitude coordinates, altitude, current geographic region (e.g., the first region 102 or second region 104), proximity to a boundary 103, whether a boundary 103 has been crossed, etc. A signal indicator may include information relating to signal data discussed above, including an indicator that a signal quality, signal strength, etc. has changed beyond a particular threshold.

If the indicator is a geographic indicator, the indicator may be used to determine that the mobile platform 110 has passed (or will soon pass) from a first region 102 into a second region 104 (block 406). Because the second antenna array 134 is better suited for operation in the second region 104, the mobile platform-mounted mobile communicator controller 136 may instruct the first antenna array 132 to deactivate and to activate the second antenna array 134 (block 408). During the transition, the mobile platform-mounted mobile communicator controller 136 may perform a handoff process to ensure a seamless transition between the use of the first antenna array 132 and the second antenna array 134. Additionally, if the mobile platform-mounted mobile communicator 130 will continue communicating with the first satellite 106, the satellite 106 may perform a handoff process. Alternatively, if the mobile platform-mounted mobile communicator 130 will be communicating with the second satellite 108 in the second region 104, the constellation of satellites may perform a handoff process to ensure a seamless transition from the first satellite 106 to the second satellite 108.

If the indicator is a signal indicator, the indicator may be used to determine that the mobile platform 110 has passed (or will soon pass) from a first region 102 into a second region 104 (block 410). However, because a signal-based determination of region may not be a boundary on a map, it may be advantageous to test both the first antenna array 132 and the second antenna array 134 to determine which is more suited to the current location and operating environment of the mobile platform 110. Accordingly, with or without deactivating the first antenna array 132, the mobile platform-mounted mobile communicator controller 136 may test the second antenna array 134 to determine if the using the second antenna array 134 is associated with an improved signal (block 412). Signal data associated with the use of the first antenna array 132 may be compared to signal data associated with the use of the second antenna array 134 to determine which antenna has a better signal (block 414). Signals from both antennas can be continuously monitored by the signal sensor. Alternatively, no discrete measurement is needed, as both antennas can receive "lock" simultaneously, and the sensor may be used in determining which link to "close" (communicate bi-directionally). A better signal may include higher signal quality, higher signal power, a signal closer to one or more optimal operating parameters, etc. If the signal from using the first antenna array 132 is better than the signal from using the second antenna array 134, then the mobile platform-mounted mobile communicator controller 136 may determine to continue using the first antenna array 132 and deactivate the second antenna array 134 (block 416). The method 300 may end, or the method 300 may loop and wait until a second indicator is received that it may be advantageous to switch antenna arrays is received and repeat the process discussed above. If the signal from using the second antenna array 134 is better, the mobile platform-mounted mobile communicator controller 136 may instruct the first antenna array 132 deactivate and to activate the second antenna array 134 (block 418). During the transition, the mobile platform-mounted mobile communicator controller 136 may perform a handoff process to ensure a seamless transition between the use of the first antenna array 132 and the second antenna array 134. Additionally, if the mobile platform-mounted mobile communicator 130 will continue communicating with the first satellite 106, the satellite 106 may perform a handoff process. Alternatively, if the mobile platform-mounted mobile communicator 130 will be communicating with the second satellite 108 in the second region 104, the constellation of satellites may perform a handoff process to ensure a seamless transition from the first satellite 106 to the second satellite 108.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Aspect 1. A mobile platform-mounted mobile communicator for communicating with a constellation of satellites comprising: a first antenna optimized for operation using a first frequency band in a first geographic region; a second antenna optimized for operation using either the first frequency band or a second frequency band in a second geographic region; a controller configured to determine which antenna to activate based on one or more of a geographic indicator or a signal indicator; and a radome enclosure for the platform-mounted mobile communicator configured to enclose the first antenna, the second antenna or both the first and second antennas.

Aspect 2. The mobile platform-mounted mobile communicator of aspect 1, wherein the mobile platform-mounted mobile communicator is mounted to one of an airplane, an automobile, or a ship.

Aspect 3. The mobile platform-mounted mobile communicator of either aspect 1 or 2, wherein the first geographic region is proximate to the North Pole or South Pole and wherein the second geographic region is proximate to the Equator.

Aspect 4. The mobile platform-mounted mobile communicator of any one of aspects 1-3 wherein the first frequency band is one of a $K_u$-band or $K_a$-band and the second frequency band is one of a $K_u$-band or $K_a$-band.

Aspect 5. The mobile platform-mounted mobile communicator of any one of aspects 1-4 wherein the geographic indicator is a set of GPS coordinates.

Aspect 6. The mobile platform-mounted mobile communicator of any one of aspects 1-4 wherein the signal indicator is one of a signal-noise indicator, a throughput indicator, an interference indicator, a distortion indicator, or an attenuation indicator.

Aspect 7. A method of communicating with a constellation of satellites using a mobile platform comprising: communicating with the constellation of satellites on a first frequency band using a first antenna, wherein the first antenna is optimized for operation in a first geographic location; determining, with a processor, to terminate communication via the first antenna and begin communication via a second antenna based on one of a geographic indicator or a signal indicator; wherein the second antenna is optimized for operation in a second geographic location; and communicating with the constellation of satellites on either the first frequency band or a second frequency band using the second antenna.

Aspect 8. The method of communicating with a constellation of satellites of aspect 7, further comprising mounting the mobile platform-mounted mobile communicator to one of an airplane, an automobile, or a ship.

Aspect 9. The method of communicating with a constellation of satellites of either aspect 7 or 8, further comprising optimizing the first antenna for operation proximate to the North Pole or South Pole and optimizing the second antenna for operation proximate to the Equator.

Aspect 10. The method of communicating with a constellation of satellites of any one of aspects 7-9, further comprising communicating with the constellation of satellites on one of a $K_u$-band, a $K_a$-band or both.

Aspect 11. The method of communicating with a constellation of satellites of any one of aspects 7-10, wherein determining to terminate communication via the first antenna and begin communication via the second antenna based on the geographic indicator comprises determining to terminate communication via the first antenna and begin communication via the second antenna based on a set of GPS coordinates or similar positional data.

Aspect 12. The method of communicating with a constellation of satellites of any one of aspects 7-10, wherein determining to terminate communication via the first antenna and begin communication via the second antenna based on the signal indicator comprises determining to terminate communication via the first antenna and begin communication via the second antenna based on one of a signal-noise indicator, a throughput indicator, an interference indicator, a distortion indicator, or an attenuation indicator.

Aspect 13. A method of communicating with a mobile communicator mounted to a mobile platform comprising: configuring a first antenna of the mobile communicator to establish communication with a first satellite; communicating data packets with the first satellite via the first antenna; receiving one or more of a geographic indicator or a signal indicator; based on the one or more of a geographic indicator or a signal indicator, determining, by a processor, to terminate communication via the first antenna and begin communication via a second antenna of the mobile communicator; terminating communication via the first antenna; configuring the second antenna to establish communication with one of the first satellite or a second satellite; and communicating data packets with one of the first satellite or the second satellite via the second antenna.

Aspect 14. The method of communicating with a mobile communicator mounted to a mobile platform of aspect 13, further comprising mounting the mobile platform-mounted mobile communicator to one of an airplane, an automobile, or a ship.

Aspect 15. The method of communicating with a mobile communicator mounted to a mobile platform of either aspect 13 or 14, further comprising optimizing the first antenna for operation proximate to the North Pole or South Pole and optimizing the second antenna for operation proximate to the Equator.

Aspect 16. The method of communicating with a mobile communicator mounted to a mobile platform of any one of aspects 13-15, further comprising communicating with the first and second satellites on one of a Ku-band, Ka-band or both.

Aspect 17. The method of communicating with a mobile communicator mounted to a mobile platform of any one of aspects 13-16, wherein determining to terminate communication via the first antenna and begin communication via the second antenna based on the geographic indicator comprises determining to terminate communication via the first antenna and begin communication via the second antenna based on a set of GPS coordinates or similar positional data.

Aspect 18. The method of communicating with a mobile communicator mounted to a mobile platform of any one of aspects 13-16, wherein determining to terminate communication via the first antenna and begin communication via the second antenna based on the signal indicator comprises determining to terminate communication via the first antenna and begin communication via the second antenna based on one of a signal-noise indicator, a throughput indicator, an interference indicator, a distortion indicator, or an attenuation indicator.

What is claimed:

1. An aircraft-mounted mobile communicator comprising:
a first communication portion and a second communication portion, wherein the first communication portion and the second communication portion are configured to communicate data directly with one or more satellites; and
a controller configured to:
(i) control the first communication portion to communicate data with or without controlling the second communication portion to communicate data,
(ii) in response to a signal indicator received after (i), test communication via the second communication portion while continuing to communicate data via the first communication portion,
(iii) compare a first signal associated with use of the first communication portion and a second signal associated with use of the second communication portion, and
(iv) if the second signal has a higher power or quality than the first signal, terminate communication via the first communication portion and begin communication via the second communication portion.

2. The aircraft-mounted mobile communicator of claim 1, wherein the controller is configured to control the first communication portion to communicate data without controlling the second communication portion to communicate data.

3. The aircraft-mounted mobile communicator of claim 2, wherein the controller is configured to continue communication via the first communication portion if the first signal has a higher power or quality than the second signal.

4. The aircraft-mounted mobile communicator of claim 1, the first communication portion being optimized for operation using a first frequency band and the second communication portion being optimized for operation using a second frequency band.

5. The aircraft-mounted mobile communicator of claim 4, wherein the first frequency band is one of a $K_u$-band or $K_a$-band and the second frequency band is the other one of the $K_u$-band or $K_a$-band.

6. The aircraft-mounted mobile communicator of claim 1, the first communication portion being optimized for operation using a first frequency band in a first geographic region.

7. The aircraft-mounted mobile communicator of claim 6, the second antenna being optimized for operation using either the first frequency band or a second frequency band in a second geographic region.

8. The aircraft-mounted mobile communicator of claim 7, wherein the first geographic region is proximate to the North Pole or South Pole and wherein the second geographic region is proximate to the Equator.

9. The aircraft-mounted mobile communicator of claim 1, the signal indicator being representative of at least one of a signal-noise ratio, attenuation, interference, degradation, or electromagnetic environment.

10. The aircraft-mounted mobile communicator of claim 1, wherein the first communication portion comprises a first antenna and the second communication portion comprises a second antenna.

11. An aircraft-mounted mobile communicator comprising:
an antenna unit configured to communicate data directly with one or more satellites via at least one of a first frequency band and a second frequency band; and
a controller configured to:
(i) control the antenna unit to communicate data via the first frequency band without communicating data via the second frequency band,
(ii) in response to a signal indicator received after (i), control the antenna unit to test communication via the second frequency band while continuing to communicate data via the first frequency band,
(iii) compare a first signal associated with communicating data via the first frequency band and a second signal associated with communicating data via the second frequency band, and
(iv) if the second signal has a higher power or quality than the first signal, control the antenna unit to terminate communication via the first frequency band and begin communication via the second frequency band.

12. The aircraft-mounted mobile communicator of claim 11, wherein the controller is configured to continue communication via the first frequency band if the first signal has a higher power or quality than the second signal.

13. The aircraft-mounted mobile communicator of claim 11, wherein the antenna unit comprises a first antenna optimized for operation using the first frequency band and a second antenna optimized for operation using the second frequency band.

14. The aircraft-mounted mobile communicator of claim 11, wherein the first frequency band is one of a $K_u$-band or $K_a$-band and the second frequency band is the other one of the $K_u$-band or $K_a$-band.

15. The aircraft-mounted mobile communicator of claim 11, wherein the antenna unit is optimized for operation using the first frequency band in a first geographic region and the second frequency band in a second geographic region.

16. The aircraft-mounted mobile communicator of claim 15, wherein the first geographic region is proximate to the North Pole or South Pole and wherein the second geographic region is proximate to the Equator.

17. The aircraft-mounted mobile communicator of claim 11, the signal indicator being representative of at least one of a signal-noise ratio, attenuation, interference, degradation, or electromagnetic environment.

* * * * *